356-138. SR 4-16-74 OR 3,804,524

United States Patent [19]

Jocoy et al.

[11] 3,804,524

[45] Apr. 16, 1974

[54] APPARATUS FOR CONTROLLING FINGERPRINT IDENTIFICATION

[76] Inventors: Kenneth P. Jocoy, 1100 Sierra Vista, Apt. 4, Las Vegas, Nev. 89109; Gregory Nanus, 2241 Russell Rd., Las Vegas, Nev. 89119

[22] Filed: Aug. 31, 1972

[21] Appl. No.: 285,502

[52] U.S. Cl. ....... 356/138, 340/146.3 E, 340/149 A

[51] Int. Cl. ........ G06k 9/02

[58] Field of Search ........ 356/138, 165; 250/221; 33/1 BB; 128/77; 340/146.3 E; 269/328; 248/118, 118.1

[56] References Cited

UNITED STATES PATENTS

| | | | |
|---|---|---|---|
| 3,716,301 | 2/1973 | Caulfield et al. | 356/165 |
| 2,048,879 | 7/1936 | Moran | 33/1 BB |
| 3,581,282 | 5/1971 | Altman | 340/146.3 E |
| 3,576,538 | 4/1971 | Miller | 340/146.3 E |
| 3,614,737 | 10/1971 | Sadowsky | 340/146.3 E |
| 3,576,537 | 4/1971 | Ernst | 340/146.3 E |
| 3,383,657 | 5/1968 | Claasen | 340/146.3 E |

*Primary Examiner*—Ronald L. Wibert
*Assistant Examiner*—Steven K. Morrison
*Attorney, Agent, or Firm*—Jerry R. Seiler

[57] ABSTRACT

Apparatus for directing and positioning a finger for print identification comprises a window having a surface on which a finger is placed, forwardly moving stop means for determining longitudinal placement of a finger and lateral finger guide means for determining the location of said finger with respect to said window, the first of said lateral guide means being substantially laterally stationary and the second being movable and biased toward said first lateral guide means, and means for directing a hand toward said window.

8 Claims, 4 Drawing Figures

APPARATUS FOR CONTROLLING FINGERPRINT IDENTIFICATION

BACKGROUND OF THE INVENTION

Personal identification in attempts to obviate the problem of unauthorized persons using another's credit cards, checks and the like thereof has become increasingly problematic. For example, various means or devices for detecting unauthorized credit card users have been devised but to date none have been generally accepted or extensively used.

Especially desirable means for personal identification are fingerprint identification systems which are by far the most reliable means known to date. Such reliability is due to the fact that a person's fingerprints do not vary substantially regardless of the person's age, unlike facial features or even handwriting which vary from time to time. Moreover, handwriting identification usually requires experienced and expert personnel and even then reliability is sometimes questionable. Facial features vary and identification may be difficult depending on a person's change in weight, age, hairline, whether or not glasses are worn, etc. thus making reliable comparisons by inexperienced clerks, storekeepers, bank tellers and the like unacceptable.

Fingerprint identification and comparison may be readily accomplished by modern electronic scanning and comparing equipment so that such comparison identification may be carried out almost instantaneously and reliably with proper equipment. However, the major problem with such a concept is in achieving a fingerprinting apparatus which is substantially fool proof and simple to use by inexperienced operators. Such an apparatus must provide reliable repetition in placing a finger therein for comparative identification purposes, even without the presence of an experienced or expert operators.

A number of devices have been proposed such as disclosed in U.S. Pat. Nos. 3,532,426, 3,083,682, and 3,201,961. Yet such devices have not been acceptable because they do not adequately limit or control the placement of the finger for reliable repetitive comparisons. Thus, utilizing such prior art devices, a person may put his finger in a stall or other finger guide apparatus but since the hand is not substantially guided or the finger not adequately prevented from the lateral movement except for a forward stop plate, the person's finger is usually not placed in the stall or guide apparatus the same way thereby making the identification of the print much less reliable and more difficult. It is to the elimination of such problems that the present invention is directed.

SUMMARY OF THE INVENTION

The present invention is directed to an apparatus for use in fingerprint identification and which apparatus positively directs the user's hand and finger (having the print to be identified) reliably and repetitively thereby minimizing the possibility of identification error. Unlike prior art devices, the present apparatus provides directional stability for the operator's hand and fingers so that correct readings may be taken without the use of experienced or professional operators.

The apparatus combines a transparent window having a masked border portion through which window the fingerprint may be observed by electronic scanning, photographic and/or comparing equipment (which is not part of the instant invention), a forwardly moving finger stop member, a pair of lateral finger guides, one being movable forwardly but fixed in lateral movement and the other laterally movable and biased, and a hand or palm guide, forwardly movable but laterally fixed. The apparatus, because of its design characteristics can be used by a person regardless of the size of hand or fingers. Further, involuntary lateral movement of the finger having a print to be identified is substantially prevented. The specific features of the apparatus and the advantages thereof will be more fully explained in the following detailed description.

DETAILED DESCRIPTION OF THE INVENTION

Figure 1:
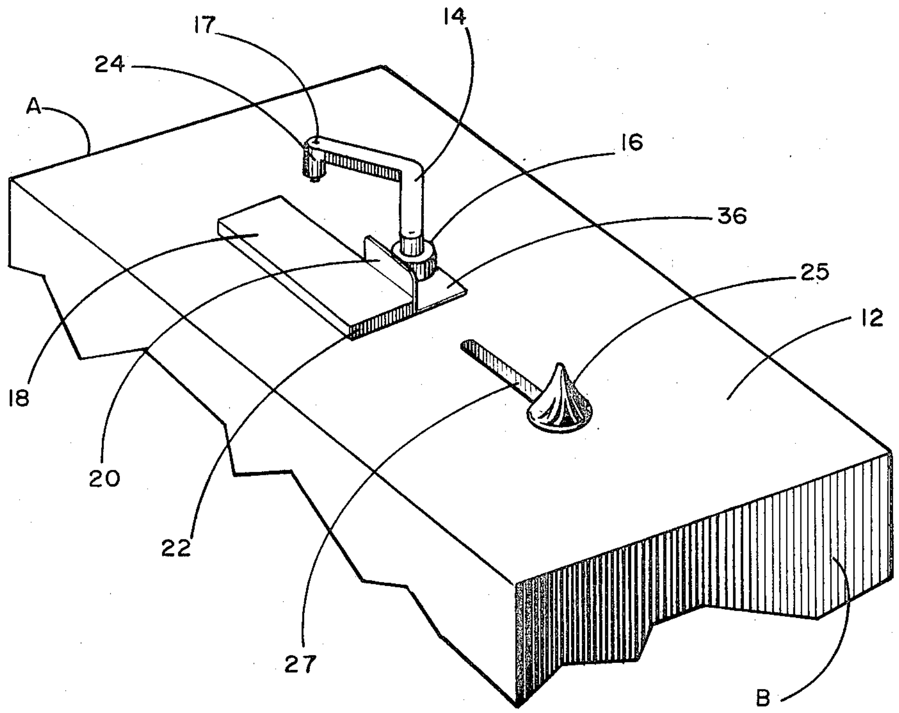
FIG. 1 is a perspective view from one side of the apparatus of the invention showing relative position of components prior to a user's hand being placed thereon.

Referring first to FIG. 1, there is shown the apparatus comprising a plate 12 on which the other components are located. For purposes of relative identification of the components, plate 12 of the apparatus has a forward end A and a rearward end B.

On the upper surface of plate 12 are exposed the palm and finger guide components comprising a forward moving stop member 18, lateral finger guide members 16 and 20 and palm guide member 25. These components are illustrated in FIG. 1 in their rest position prior to placing one's hand thereon for fingerprint identification.

Forward stop member 18 is movable longitudinally with respect to ends A and B and includes a rearwardly facing surface 22 against which the end of an operator's index finger rests. Member 18 is shown as an elongated rectangular component but the shape is not particularly critical so long as rearwardly facing surface 22 is present and so that the height of the member is at least slightly less than the thickness of a person's finger. The reason for this preferred height is so that when the end of the index finger rests against surface 22, the fingernail will not interfere but will project over the top surface of stop member 18. Such a feature will allow for a person having even rather long fingernails to utilize the device so that surface 22 will always receive the tip of the user's finger without the interference of a fingernail.

Figure 2:
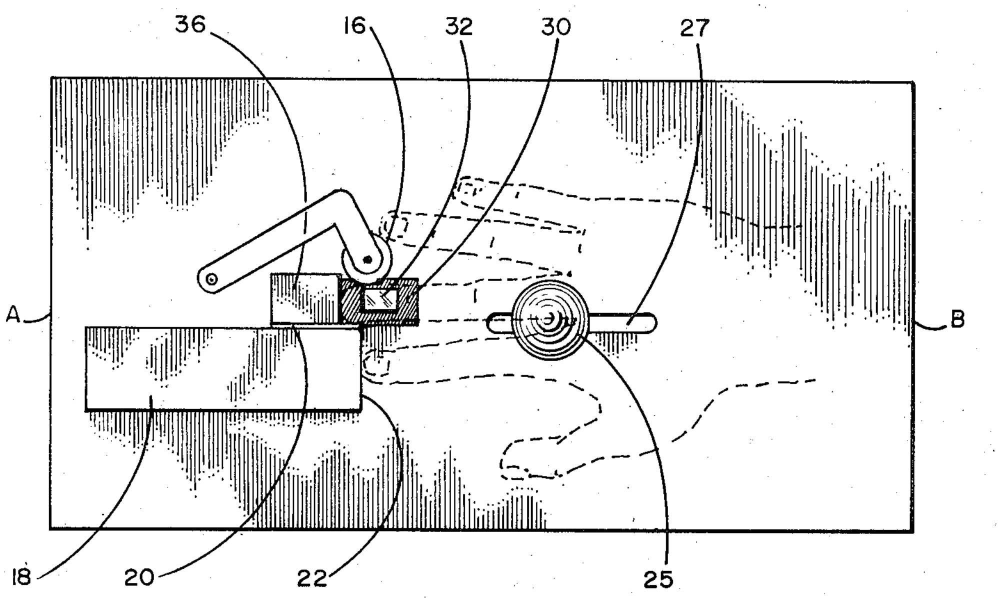
FIG. 2 is a top plan view of the apparatus of FIG. 1 showing the position of components with a user's hand in place for fingerprint identification.
Figure 3:
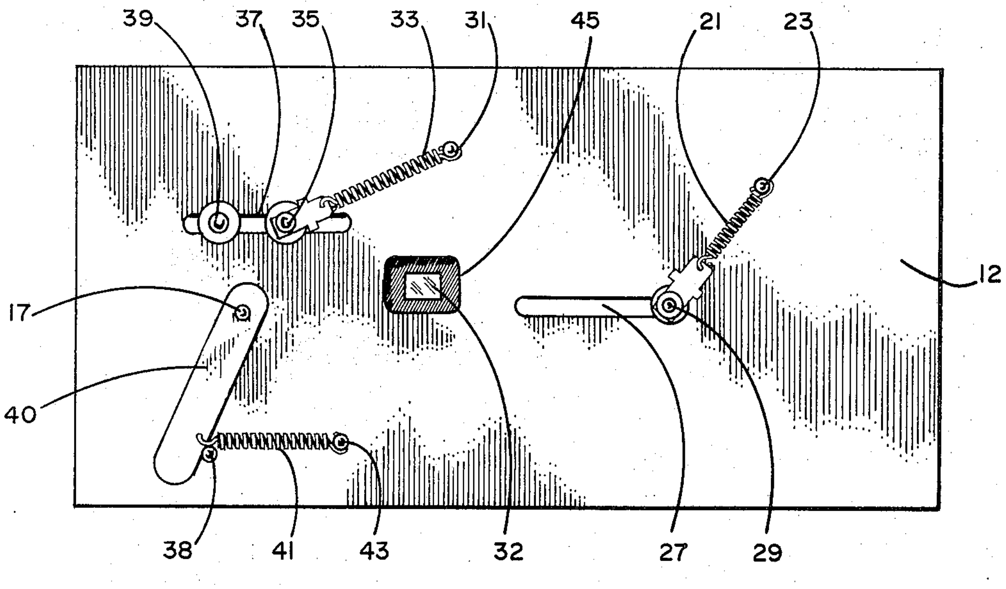
FIG. 3 is a bottom plan view of the apparatus.

Member 18 is normally biased toward end B and may be moved forwardly from rest position shown in Fig. 1 toward end A as shown in FIG. 2 when the user exerts pressure against surface 22. Referring also to FIG. 3, forward movement of stop member 18 is provided along slot 37 which slot extends through plate 12 and longitudinally with respect to window 32. Pins 35 and 39 are attached to the underside of stop member 18 so that the pins are guided along the longitudinal slot 37 which provides for the limited reciprocal movement of the stop member. It will also be noted that guide pin 35 is attached to spring 33 in turn attached to anchor peg 31 for biasing the stop member toward rearward end B. In this manner, stop member 18 is in the normal rest position as shown in FIG. 1 and attached window cover 36 covers window 32 unless a user has placed his hand in the device and displaced the stop member for fingerprint identification as shown in FIG. 2.

Lateral guide members 16 and 20 are provided for guiding a user's middle finger therebetween to prevent any significant and involuntary lateral movement. First lateral guide member 20 is secured to stop member 18 along the side adjacent lateral guide member 16. First guide member 20 may be elongated and extend upwardly somewhat from the upper surface of stop member 18 but the shape is not particularly critical so long as a surface against which the side of a user's middle finger may be positioned for lateral stability is provided. Accordingly, it will be noticed that the first lateral guide member, being attached to stop member 18 cannot be moved independently from the stop member and thus is secured substantially against lateral movement since the stop member may be moved only longitudinally as previously explained.

Second lateral guide member 16 is attached to an arm 14 which arm pivots about a pin 17 and post 24. Referring also to FIG. 3, pivot pin 17 is secured to lever 40 on the underside of plate 12. At or near the lever end opposite pin 17 is a spring 41 in turn attached to anchor pin 43 thereby biasing lever 40 and in turn arm 14. A pin 38 is optionally provided to provide a stop for biased arm 14 and lateral finger guide 16. Thus, because of spring 41, lateral guide member 16 will be biased toward lateral guide member 20 and stop plate 18 and when a person's finger is placed between these two lateral guide members, it will be contacted by both members. The left side of the finger will be held against lateral guide member 20 which does not move laterally while guide member 16 presses against the right side of the finger due to its bias, so that the user will be conscious of the lateral stability on both provided by these members. It will also be evident that guide member 16 can be moved outwardly or away from guide member 20 as the user's finger is placed therebetween and again, which guide member 16 will then return to compress one side of the user's finger. It is this feature that will prevent the user from inadvertently displacing his middle finger laterally.

A fourth guiding means comprises palm guide member 25 which is movable along slot 27 extending through plate 12. Referring also again to FIG. 3, guide pin 29 is secured to palm guide member 25 and a spring is attached between the pin 29 and anchor 23 so as to bias the palm guide member toward side B of the apparatus in a normal rest position. The purpose of palm guide member 25 is to provide additional lateral stability and prevent a user's finger from pivoting during fingerprint identification. The guide also directs the user's hand so that the fingers are moved substantially longitudinally between ends A and B. This is accomplished by the user placing the cone shaped palm guide member 25 between adjacent fingers, preferably between the index and middle fingers so that the upper tip of the cone extends between the fingers preferably adjacent the hand or knuckles. Such a position is generally illustrated in FIG. 2. Since palm guide member 25 does not move substantially laterally but instead moves only along slot 27, the user's hand is prevented additionally from substantial or significant lateral movement thereby further limiting the possibility of error due to the user improperly positioning his fingers relative to window 32 for print indentification.

Another important feature of the apparatus is the window 32 against which the user places his finger for print identification. Window 32 is transparent so that the fingerprint may be readily observed by electronic scanning or photographic or other sensing equipment to determine the fingerprint lines observed or detected through the window. Further, the actual transparent area is defined by a masked portion 30 the size or dimensions of which may be varied somewhat depending on how the scanning or electronic detecting apparatus is programmed. However, preferably the transparent window 32 defined by masked portion 30 is such that when a user's finger is pressed lightly on the window surface, so that the finger is flattened thereagainst somewhat, any portion of the finger which is not flat will not be visible through the window. In other words, if the transparent window were too large, precise fingerprint reading is less efficient since a portion of the fingerprint around the periphery will be curved and deformed rather than completely flat. Moreover, outside light would also be allowed to pass through thereby altering the efficiency of the reading or identification. On the other hand, if the transparent area is too small, there may not be enough of a fingerprint or finger tip print lines or pattern to give a sufficient reading. Preferably, the area will generally cover about 50% of the ball of the finger.

The material of which the window is constructed must be substantially transparent. Materials such as glass or plastic are preferred excluding prisms or the like. Thicker materials are usually less transparent thereby lowering the efficiency and possibly resulting in some distortion of the fingerprint pattern. However, it will be evident that the material must not be too thin which would otherwise make it unduly fragile. The substantially flat transparent window 32 also will tend to yield a hermetic contact between the raised finger surface ridges and the window surface where natural or synthetic moisture is present. It is believed that where the light source and observing or identifying means are at complementary angles with the flat fingerprint window surface, light passing through the window will tend to be absorbed at points of hermetic contact while other points or areas will reflect. Thus, raised finger lines or ridges will appear dark while fingerprint grooves will be observed as light. It may be desired to add a suitable liquid to the window surface to further achieve such a result.

Masked area 30 may be any opaque or non-transparent material such as tape, paint and the like. Specific materials are not critical so long as no light can enter except for the transparent window 32 and for this purpose a black mask, paint or tape will be preferred.

The masked area may also be a separate window defining mask component of the apparatus and may be independently movable relative to a fixed window. Such a mask could be moved in response to electronic or mechanical control means and could be shifted to a desired position on the window depending on the location of the laterally biased and movable guide member when at rest against the user's finger. The position could also be varied depending on the stop member position or by a mechanical probe member contacting the end of the middle finger to be identified.

In operating the device, it is used and functions as follows:

Prior to a user or operator placing his hand on the device, the components in the rest position are shown in FIG. 1. The operator then places his hand on the platform so that palm guide member 25 is between the index and middle finger. The operator then moves his hand forwardly toward platform end A with his fingers closed, extended and passing lightly over the surface of platform 12. Since the critical guide for the middle finger to be identified will be between lateral guide members 16 and 20, the operator guides his middle finger so that it passes therebetween and maintains the left side of the middle finger firmly against first lateral guide member 20 which is laterally fixed. At the same time, the end of the index finger abuts against end 22 of stop member 18 as the operator continues to move his hand, stop member is pushed forwardly toward end A until the stop position is reached as determined by the length of slot 37. The hand will be in approximately the position shown in FIG. 2 with window 32 exposed for fingerprint identification. Again, second lateral guide means 16 will abut the right side of the middle finger so that the operator will be conscious that the finger is properly placed between that guide member and guide member 20.

Not only is the middle finger laterally stabilized, but it will be properly on the window due to the forward stop position of the user's hand caused by the forward limit of stop member 18. Thus, that stop position for the user's index finger will place his outstretched middle finger longitudinally at the precise position on the window. Moreover, the end of the middle finger will not be encumbered by abuttment against a member which would compress the finger skin and could cause some print distortion. It is also believed that this absence of contact with the middle finger end allows the user to extend his finger naturally without discomfort. Further, since one of the lateral guide members is biased but adjustable laterally, the finger to be identified may be of any size. Thus, the positive guide features of the apparatus is not dependent on or limited by finger size variations. It is this means for positive lateral positioning of the middle finger which is a critical feature of the invention.

It will also be noted that palm guide member 25 will have been displaced from its original rest position shown in FIG. 1 to the position shown in FIG. 2 the extent of which displacement will depend on the length of the operator's hand and how close to the palm the operator desires the member to be located.

Figure 4:
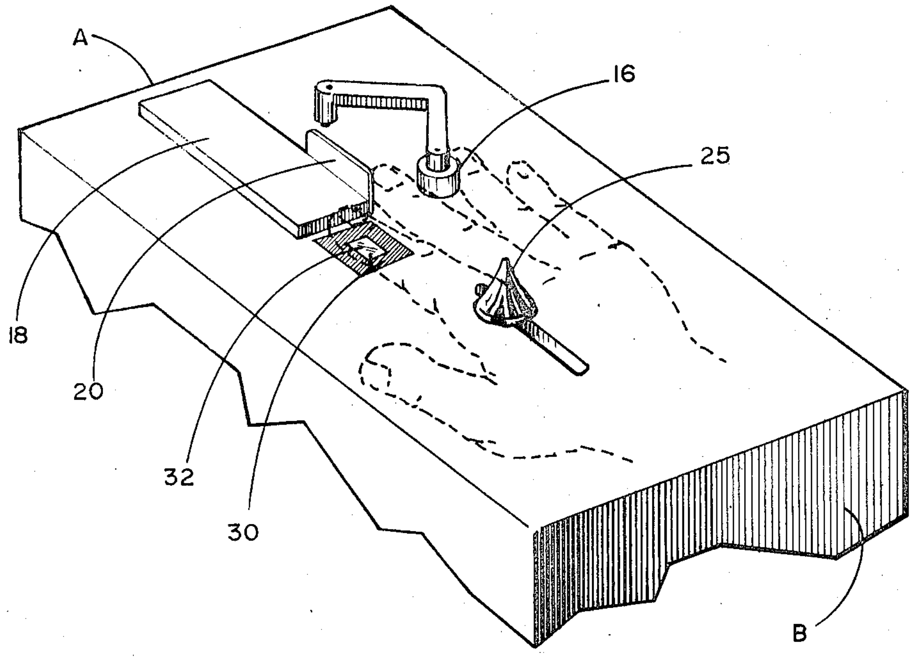
FIG. 4 is a perspective view of another embodiment of the apparatus illustrating the relative position of components with a hand placed thereon and in position for print identification.

Two embodiments of the invention are illustrated in FIGS. 2 and 4, the first for preferred use when identification of the user's middle fingerprint is intended and the latter for index finger identification. As shown in FIG. 4, where the index finger is to be identified, window 32 is located directly in line longitudinally with forward stop member 18. Although the index finger could be laterally stabilized by holding it against the middle finger, i.e., in a closed position, it will be preferred to relocate the lateral guide members for the index finger. In such event, guide member 20 need only be lengthened to lie between the index and middle fingers while guide member 16 should be placed on the other side of stop member 18 so that it will press against the index finger. However, the index finger is often scarred or the fingerprint ridges somewhat more calloused or worn. Thus, it is more desirable to identify the print of the middle finger utilizing the embodiment of FIGS. 1 and 2.

It will also be preferred to utilize a window cover 36 as shown in FIGS. 1 and 2 which acts to cover the window when the apparatus is not in use so as to prevent the collection of dust, oil, grime, etc. thereon. Such a window cover will preferably be secured to movable stop member 18 as shown so that in the rest position the window is covered while the cover is displaced as the stop member is moved. Again, viewing FIG. 2, it is understood that the components are shown in a position as they would appear with a hand placed thereon for finger identification with stop member 18 in the forward position and window 32 exposed. It will be appreciated that in the index finger identification embodiment shown in FIG. 4, stop member 18 acts as a window shield or cover when in the rest position.

In other embodiments or modifications within the purview of the invention, the laterally biased guide member need not be a disc secured to a movable arm as shown but may be in any other equivalent form to provide the same function. For example, the member may be a plate or walled structure which moves along a guide slot and is biased toward the window. The palm may also be placed on a swivel plate which has a guide member thereon which plate rotates so that the guide member will abut the middle finger.

The assembly may also be modified to accommodate identification on any finger on either hand desired by simply changing the position of the lateral guide members, window and forward stop member. However, the latter component will likely be preferably positioned for stopping the user's stronger index finger as shown and described.

The device or apparatus of the invention provides for positive hand and finger placement for improved identification as previously noted. A most important and critical aspect is the guidance of the finger for which identification is to be made against significant lateral movement by the use of a pair of positive lateral stabilizing or finger guide members. The improvements of the assembly over prior art devices and the advantges thereof as well as other mofidications will be evident to those skilled in the art.

I claim:

1. Apparatus for positioning a finger for fingerprint identification comprising:

a. a window portion including a transparent window plate having an upper surface against which a finger is placed and through which a finger surface pattern is visible;

b. movable forward stop member for determining the longitudinal placement of the finger relative to said window position;

c. lateral middle finger guide means comprising a left guide member attached to said forward stop means and an independent laterally movable right guide member biased toward said left guide member for bearing against the right side of said middle finger placed between said guide members, whereby said middle finger is substantially laterally stabilized; and d. independent palm guide means for directing a palm forward and for preventing substantial lateral displacement relative to said window portion comprising an upwardly extending, forwardly movable, rearwardly biased member.

2. The apparatus of claim 1 wherein said window portion includes an inner transparent pane and an opaque border defining said pane.

3. The apparatus of claim 2 wherein said forward stop member is movable substantially longitudinally with respect to the axis of an index finger and includes a forward surface for abutting an index finger end.

4. The apparatus of claim 3 wherein said forward stop member is biased toward a first position and movable to a second position at which the user's middle finger is properly positioned longitudinally with respect to said window portion.

5. The apparatus of claim 4 wherein said left guide member is secured along the right side of said forward stop member for abutting a portion of the left side of said middle finger.

6. The apparatus of claim 1 including a plate member having an upper flat surface on which said window portion, forward stop means, finger guide members and hand guide means are located.

7. The apparatus of claim 6 wherein said window portion is disposed to the right of said left guide member for placement of a middle finger thereon.

8. The apparatus of claim 6 wherein said window portion is disposed longitudinally in line with said forward stop member for placement of an index finger thereon.

* * * * *